United States Patent
Uebel et al.

(10) Patent No.: US 8,354,808 B2
(45) Date of Patent: Jan. 15, 2013

(54) AUTOMATIC DETECTION OF A MECHANICALLY COMMUTATED DC MOTOR

(75) Inventors: Wolfgang Uebel, Weitramsdorf (DE); Jovan Knezevic, Bamberg (DE)

(73) Assignee: Brose Fahrzeugteile GmbH & Co. KG Hallstadt, Hallstadt (DE)

(*) Notice: Subject to any disclaimer, the term of this patent is extended or adjusted under 35 U.S.C. 154(b) by 0 days.

(21) Appl. No.: 13/235,331

(22) Filed: Sep. 16, 2011

(65) Prior Publication Data
US 2012/0062156 A1   Mar. 15, 2012

Related U.S. Application Data

(63) Continuation of application No. PCT/EP2010/001634, filed on Mar. 16, 2010.

(30) Foreign Application Priority Data

Mar. 16, 2009 (DE) .......... 10 2009 013 063

(51) Int. Cl.
*H02P 6/16* (2006.01)
*H02P 6/10* (2006.01)
*H02P 6/00* (2006.01)
*H02P 3/00* (2006.01)
*H03K 5/00* (2006.01)

(52) U.S. Cl. ......... 318/400.12; 318/400.13; 318/400.23; 318/400.25; 318/400.01; 318/470; 318/490; 318/498

(58) Field of Classification Search ............. 318/400.12, 318/400.13, 400.23, 400.25, 400.01, 470, 318/490, 798
See application file for complete search history.

(56) References Cited

U.S. PATENT DOCUMENTS

| | | | |
|---|---|---|---|
| 7,696,708 B2* | 4/2010 | Kurimoto et al. | 318/400.23 |
| 2007/0273363 A1* | 11/2007 | Kurimoto et al. | 324/177 |
| 2008/0298784 A1 | 12/2008 | Kastner | |
| 2010/0315032 A1* | 12/2010 | Crocomo et al. | 318/650 |
| 2011/0270558 A1* | 11/2011 | Knezevic et al. | 702/65 |

FOREIGN PATENT DOCUMENTS

DE   41 35 873   4/1993

\* cited by examiner

*Primary Examiner* — Walter Benson
*Assistant Examiner* — Gabriel Agared
(74) *Attorney, Agent, or Firm* — Muncy, Geissler, Olds & Lowe, PLLC

(57) ABSTRACT

In order to automatically detect a mechanically commutated DC motor, it is provided to acquire an electrical engine size, to determine current ripples in the engine size, to evaluate the amplitude, the duration and/or time position of the detected current ripples and to compare to known ripple patterns, and to choose from a known key data table a number of key data assigned to a certain engine type, when the amplitude, during and/or time position of the detected current ripples correspond to a ripple pattern, which is assigned to the engine type.

8 Claims, 3 Drawing Sheets

AUTOMATIC DETECTION OF A MECHANICALLY COMMUTATED DC MOTOR

This nonprovisional application is a continuation of International Application No. PCT/EP2010/001634, which was filed on Mar. 16, 2010, and which claims priority to German Patent Application No. DE 10 2009 013 063.2, which was filed in Germany on Mar. 16, 2009, and which are both herein incorporated by reference.

BACKGROUND OF THE INVENTION

1. Field of the Invention

The invention relates to a method for automatic detection of a mechanically commutated DC motor (commutator motor). The invention additionally relates to a device for carrying out the method, and to the use of a modified commutator motor for the method.

2. Description of the Background Art

Commutator motors are used, in particular, as actuating motors within actuating devices (actuating systems) in a motor vehicle, for example as a drive for an electric power window regulator or for an electric seat adjustment mechanism. Frequently the knowledge of specific motor parameters (device constants), such as the number of poles, the commutator segment pitch count, the motor resistance, the motor inductance, the rated current, the rated voltage, etc., is required for control and/or monitoring of the motor in such an actuating device. One or more of these parameters is required, in particular, in order to calculate the motor position or motor load or other operating quantity of the motor using a motor model (which is to say a mathematical formula simulating the electrical, thermal, and/or mechanical behavior of the motor). The motor parameters required in each case typically are stored in a control unit of the actuating system by software.

The dependence of control and monitoring processes on motor-specific parameters hinders, in a disadvantageous way, the replacement of the motor associated with an actuating device, e.g., by a motor with a different output or by a motor from a different manufacturer, especially since the control unit associated with the actuating device generally has to be reprogrammed to the new motor parameters when the motor is replaced. On the other hand, however, easy and flexible replaceability of motors is highly desirable in motor vehicle actuating devices, for example in order to be able to adapt such actuating devices easily to different application purposes, in particular different vehicle types.

SUMMARY OF THE INVENTION

It is therefore an object of the invention to allow flexible and easy replacement of a commutator motor in a motor vehicle actuating device.

The object is achieved according to an embodiment of the invention by a method for automatic detection of the motor with regard to the motor type of which it is a member.

The invention is based in general on the idea of coding the commutator motors provided for use in such actuating devices through mechanical and/or electromechanical modification in such a manner that each motor type is identifiable using the characteristics of the current ripple it produces. In this context, (motor current) ripple designates a characteristic ripple (i.e., periodic, pulsating variations) of the motor current that is caused by the commutation of the DC motor.

According to the method, an electrical motor quantity can be sensed, and current ripples in the time behavior of this motor quantity are detected. In addition, the amplitude, duration, and/or position in time of the detected ripples are analyzed and compared with ripple patterns known in advance. In this process, the parameters associated with a specific motor type are selected from a parameter table that is known in advance when the amplitude, duration, and/or position in time of the detected ripples match (based on predetermined criteria) a ripple pattern that is associated with this motor type.

Variants that can be used within the scope of the invention for modifying a commutator motor and corresponding influencing of its ripple pattern are described (in another context) in DE 41 35 873 C2, which is referenced in its entirety in this sense. Preferably, however, the modification within the scope of the invention is accomplished by the means that one or more windings of the motor are wound with a slightly lower or higher number of turns than the rest of the windings. In four-winding motors with a standard 25 turns per winding, the following turns ratios are examples of ratios that could be used for coding different motor types:

TABLE 1

| Motor Type | Coding Scheme | Turns Ratio |
|---|---|---|
| A | 1:0:0:0 | 27:25:25:25 |
| B | −1:0:0:0 | 23:25:25:25 |
| C | 1:−1:0:0 | 27:23:25:25 |
| D | 1:1:0:0 | 27:27:25:25 |
| E | 1:0:1:0 | 27:25:27:25 |
| ... | ... | ... |

The coding of the type −1:0:0:0 is also achieved alternatively in an eight-winding motor with an advantageous turns ratio of 26:24:25:25:27:26:25:25. Here, the ripple pattern repeats with each half-cycle of the motor.

The sensed motor quantity can be the back electromotive force (also called back electromagnetic force, BEMF for short, or counter-electromotive force) that is produced during operation of the motor. The BEMF can be calculated from a predefined motor model using the measured motor current and the measured motor voltage.

The motor model used in the method is a mathematical formula, in particular of the form:

$$E = U_m - R_a \cdot I_a - L_a \cdot \frac{dI_a}{dt}, \qquad \text{Eq. 1}$$

or a circuit module or program module implementing this formula. In equation 1, wherein E represents the back electromotive force (BEMF) measured in units of an electric voltage, $U_m$ represents the motor voltage present at the motor contacts, $R_a$ represents the ohmic motor resistance, $I_a$ represents the electric motor current flowing between the motor contacts, or more precisely, the current amplitude of the same, and $L_a$ represents the inductance of the motor.

The quantities E, $U_m$ and $I_a$ are time-dependent measured quantities, which is to say they are functions of time. The quantities $R_a$ and $L_a$ are constants that are provided with predetermined standard (default) values for carrying out the above-described method. (The actual motor resistance and the actual inductance, as motor-specific parameters, are not known until after motor detection, consequently not until after carrying out the above-described method.)

Furthermore, however, the sensed motor quantity can also be the motor current (more precisely, the current amplitude of the same), or the motor voltage, such as the self-inductance component thereof.

Parameter data for at least two—but preferably for significantly more—different motor types are stored in the parameter table, with identifying information for a ripple pattern that is associated with the motor type as coding additionally being stored for each of these motor types. This information is stored in the form of threshold values, in particular. For example, for the coding scheme −1:0:0:0, which is associated with motor type B in the above example, the following are stored as identifying information: that every fourth ripple has an amplitude that falls below a first threshold value S1, and that the amplitudes of the remaining ripples lie within an interval extending between two additional threshold values S2 and S3, wherein the threshold values S1, S2 and S3 are predefined and satisfy the relationship S1<S2<S3.

The above object is additionally attained according to the invention by a control unit for controlling a mechanically commutated DC motor of an actuating device (also called actuating system) for a motor vehicle and also by an actuating device that includes this control unit as well as a mechanically commutated DC motor. The control unit here can be designed to carry out the above-described method automatically, in particular by circuit design or software. The control unit here can include, a device for sensing an electrical motor quantity, a device for detecting current ripples in the behavior of the motor quantity, a device for analyzing the amplitude, duration, and/or position in time of the detected current ripples, and for comparing them with ripple patterns known in advance that are associated with a number of motor types in a one-to-one relationship, a parameter table that is known in advance, which contains a number of parameters for each of the multiple motor types, and a device for selecting the parameters associated with a particular motor type from the parameter table when the amplitude, duration, and/or position in time of the detected current ripples match a ripple pattern that is associated with this motor type.

In an embodiment, the control unit is composed primarily of a microprocessor to which measured values of one or more motor quantities are supplied, in particular the motor current and the motor voltage, and in which the method is otherwise implemented by software.

The object is also attained by the use of a motor modified in the above-described manner for identifying a particular motor type of which the DC motor is a member, by sensing and analyzing the current ripples produced by the DC motor, in particular according to the inventive method or in the inventive actuating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
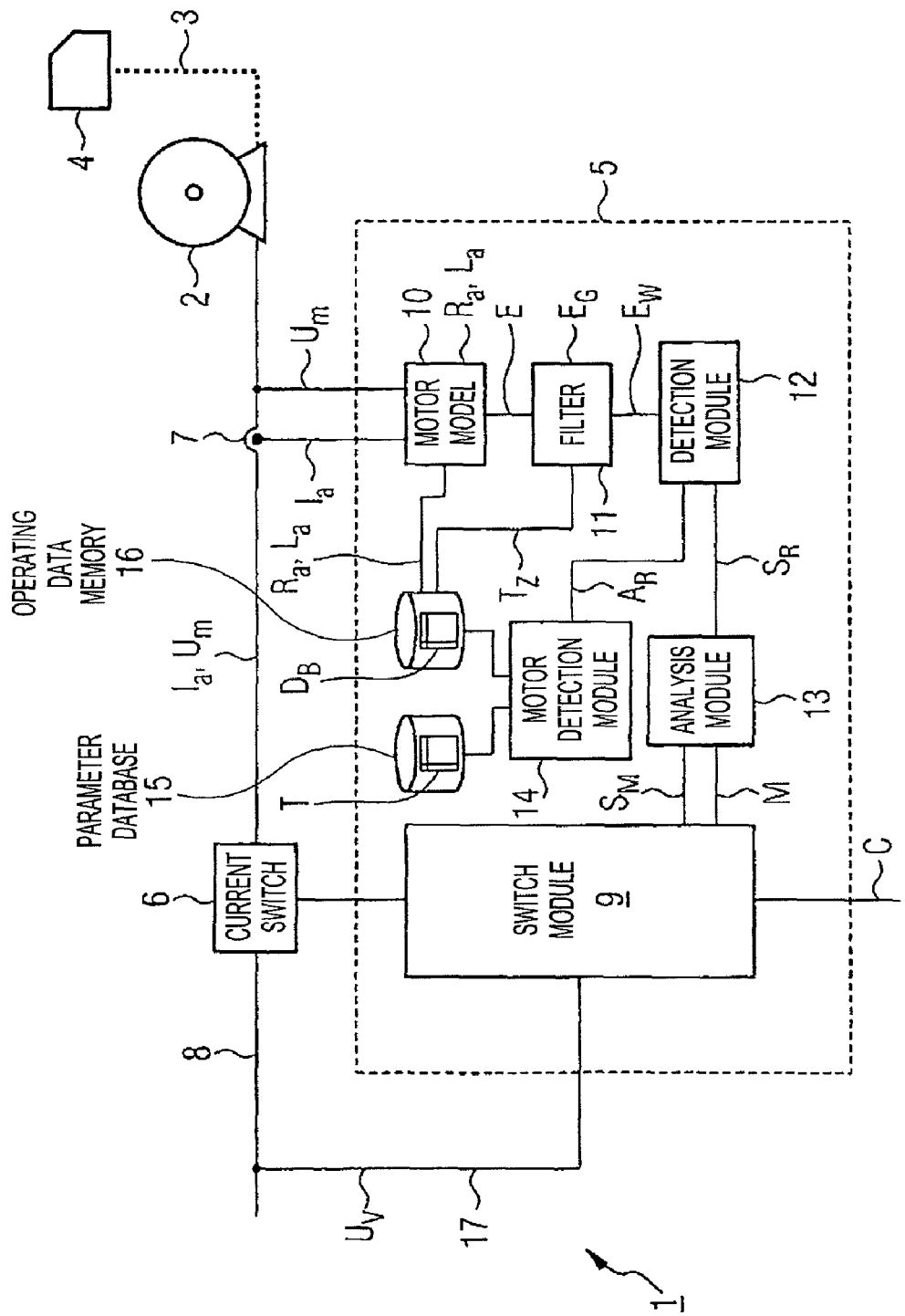
FIG. 1 is a schematic block diagram of an actuating device for a motor vehicle, with a mechanically commutated DC motor, and with a control unit for controlling the motor that is designed to identify the motor type of the DC motor by analyzing the current ripple of the motor current.

Corresponding parts and quantities are labeled with the same reference characters in all figures.

By way of example, the actuating device 1 shown schematically in FIG. 1 is an electric power window regulator, such as is customarily used in a passenger vehicle. The actuating device 1 includes a mechanically commutated (DC) motor 2, which acts on a (motor vehicle) window 4 via an actuating mechanism 3 (merely indicated) and reversibly moves said window between an open position and a closed position.

The actuating device 1 also includes a control unit 5, a motor switch 6, and a current sensor 7.

The current switch 6 is connected in a (two-phase) power supply line 8 for the motor 2. It includes two independently drivable individual switches, the switching positions of which can be used to selectably connect the two motor terminals to the positive pole or the negative pole (ground) of the power supply line 8. By appropriately setting the individual switches of the motor switch 6, the motor 2 can thus be switched on and off in each of its two directions of motion and can be reversed in polarity to switch the direction of motion.

The current sensor 7 is, in particular, a measurement resistor across which a voltage proportional to current can be tapped as a measurement signal for the motor current $I_a$ flowing in the power supply line 8. For purposes of simplification, this measurement signal is also referred to below as the motor current $I_a$, since it represents a measure of the amplitude thereof. In this regard, the current sensor 7 supplies the motor current $I_a$, or more precisely the measurement signal that is characteristic of the motor current $I_a$, to the control unit 5 as the input quantity. The motor voltage $U_m$ present in the power supply line 8 is supplied to the control unit 5 as an additional input quantity (in the sense of a measured quantity).

The control unit 5 serves to control the motor 2 by appropriate wiring of the motor switch 6. To this end, it includes a switch module 9 that operates the motor switch 6 as a function of external control commands C and a motor position signal M. The motor position signal M is an actuating variable—arbitrarily definable as a general rule—that can be derived from the position of the window 4. The motor position signal M here can be defined, in particular, as the angle of rotation of the motor 2 (in units of angular measurement). In an of the device 1, however, the motor position signal M is generated as a dimensionless number that results from counting the current ripples R (FIGS. 3 and 4) of the motor current $I_a$ in a manner described in detail below.

In order to determine the motor position signal M, the control unit 5 includes something known as a motor model 10, an (AC component) filter 11, a (current ripple) detection module 12, and an analysis module 13. The control unit 5 further includes a motor detection module 14, a parameter database 15, and an operating data memory 16. In addition, an electrical supply voltage $U_V$ is supplied to the control unit 5 through a branch line 17 from the power supply line 8.

In an embodiment of the actuating device 1, the control unit 5 is composed of a microcontroller. In this design, the switch module 9, motor model 10, filter 11, and modules 12 through 14 are implemented, in particular, in the form of software modules, which is to say functional components of software implemented in the microcontroller. Alternatively, however, the control unit 5 can also be implemented at least in part in the form of an analog and/or digital electrical circuit, wherein the switch module 9, motor model 10, filter 11, and modules 12 through 14 are implemented in the form of electrical circuits. Furthermore, mixed forms are possible in which several of the components of the control unit 5 are implemented partly through a circuit and partly through software.

The above division of the components of the control unit 5 has merely a functional character, moreover. In particular, these components can be arbitrarily combined into larger circuit or program units, or subdivided still further. Similarly, the parameter database 15 and the operating data memory 16 are functionally different memory structures, which—in terms of hardware—can be implemented in separate memory components or shared memory hardware, as desired.

A mathematical formula of the form given in Equation 1 is implemented in the motor model 10—either by programming or a circuit—through which the back electromotive force (BEMF), which was already introduced above, can be calculated as a function of the motor current $I_a$ and the motor voltage $U_m$. The motor current $I_a$ and the motor voltage $U_m$ are supplied to the motor model 10 as input quantities. The parameters of the motor model 10, namely the ohmic (motor) resistance $R_a$ and the (motor) inductance $L_a$, are predefined as constants for the motor model 10. The electromotive force E calculated using Equation 1 is output by the motor model 10 to the filter 11 that follows.

The time-dependent, varying value of the BEMF E is additively composed of a DC component $E_G$ that does not vary over time or varies only slightly, and an AC component $E_W$ that varies rapidly over time:

$$E_W = E - E_G. \qquad \text{Eq. 2}$$

In this context, the component of the BEMF E that does not vary over time or varies only slightly is defined, in particular, as the component that does not vary significantly on the typical time scale of a (motor) half cycle Z (FIG. 3), which is to say a 180° rotation of the motor 2. In a design using programming, the filter 11 is preferably composed of an algorithm that calculates the DC component $E_G$ by a moving time average calculation over the BEMF E for the duration of a half cycle Z (half-cycle period $T_Z$), in particular according to $$E_G = \frac{1}{T_Z} \cdot \int_{T_Z} E \cdot dt, \qquad \text{Eq. 3}$$

and that calculates the AC component $E_W$ according to equation 2 by subtracting the DC component $E_G$ from the BEMF E. The filter 11 forwards the ascertained AC component $E_W$ to the current ripple detection module 12.

In this context, the control unit 5 can calculate the half-cycle period $T_Z$ from the change over time of the motor position signal M, and can supply its current value in each case to the filter 11. In a design that is preferred for simplicity's sake, the half-cycle period $T_Z$ can be predefined as a constant for the filter 11, however. In particular, this constant is selected here in such a manner that its value corresponds to the average half-cycle period $T_Z$ of the motor 2 in its steady-state operation.

In a design using a circuit, the filter 11 can alternatively be designed as a high-pass filter.

As is known, current ripples R of the motor current $I_a$ are reflected in an oscillation of the BEMF E, and in particular its AC component $E_W$, that is synchronous therewith. Therefore, the detection module 12 is designed to detect maxima in the time behavior of the AC component $E_W$ as an indicator for the occurrence of a current ripple R. In order to avoid erroneous detection of current ripples R resulting from high-frequency interference in the behavior of the AC component $E_W$ as much as possible, however, the AC component $E_W$ is optionally smoothed before the search for maxima.

Upon detecting each maximum in the AC component $E_W$, the detection module 12 outputs a ripple detection signal $S_R$ to the analysis module 13. In addition, the detection module 12 ascertains the amplitude of the AC component $E_W$ at the point of the maximum and communicates this amplitude to the motor detection module 14 as the ripple amplitude $A_R$.

The analysis module 13 increases (increments) or decreases (decrements) the motor position signal M by one count unit each time the ripple detection signal $S_R$ is received, depending on the value of a motor status signal $S_M$ provided by the switch module 9, according to:

$$M = \sum_{S_R} S_M + M_0. \qquad \text{Eq. 5}$$

The ripple detection signals $S_R$ thus act as count pulses for incrementing or decrementing the motor position signal M. In this context, the analysis module 13 starts from an initial value $M_0$ of the motor position signal M, from which the motor position and the window position can be derived at the beginning of the actuation process. The motor status signal $S_M$ has the value +1 as long as the motor 2 is operated in a first direction of motion, and the value −1 as long as the motor 2 is operated in the opposite direction of motion. In contrast, the motor status signal $S_M$ has the value 0 when the motor 2 is switched off.

Figure 2:
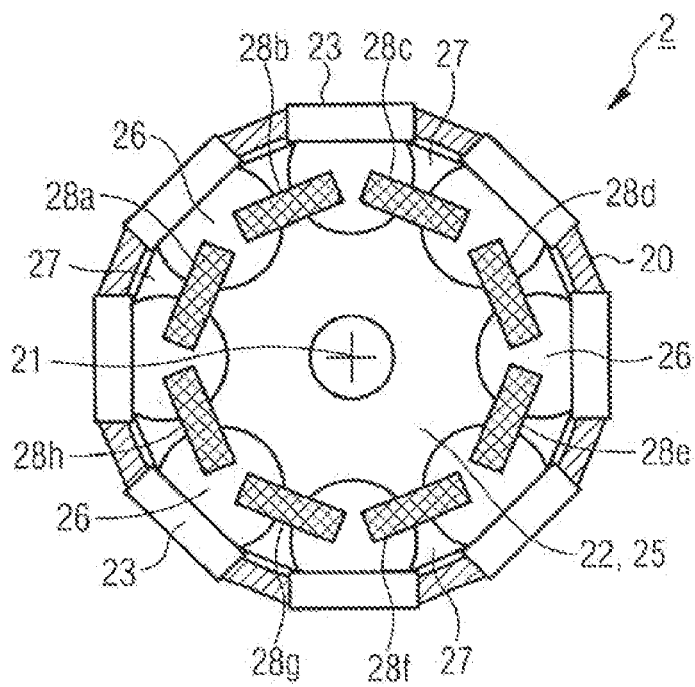
FIG. 2 is a schematic representation of the stator and rotor of the DC motor.

As is evident from FIG. 2, the motor 2 includes a stator 20 and a rotor 22 that is mounted therein such that it can rotate about a motor axis 21. The stator 20 has an essentially hollow, cylindrical lamination stack with eight permanent magnets 23 distributed uniformly about its inner circumference. Using technology that is conventional per se, the rotor 21 includes an iron core 25 that is approximately star-shaped in cross-section with eight slots 26 uniformly distributed about its circumference. A tooth 27 is formed between each pair of adjacent slots 26 in this design. Each of the eight teeth 27 is wound with an armature winding 28a-28h, through which the motor current $I_a$ flows during operation of the motor 2. In contrast to an ordinary DC motor, the motor 2 is provided with a fractional armature winding, which is to say that the armature windings 28a-28h have unequal numbers of turns. In the example shown in FIG. 2, winding 28a has 26 turns, winding 28b has 24 turns, windings 28c and 28d each have 25 turns, winding 28e has 27 turns, winding 28f has 26 turns, and windings 28g and 28h each have 25 turns.

Figure 3:
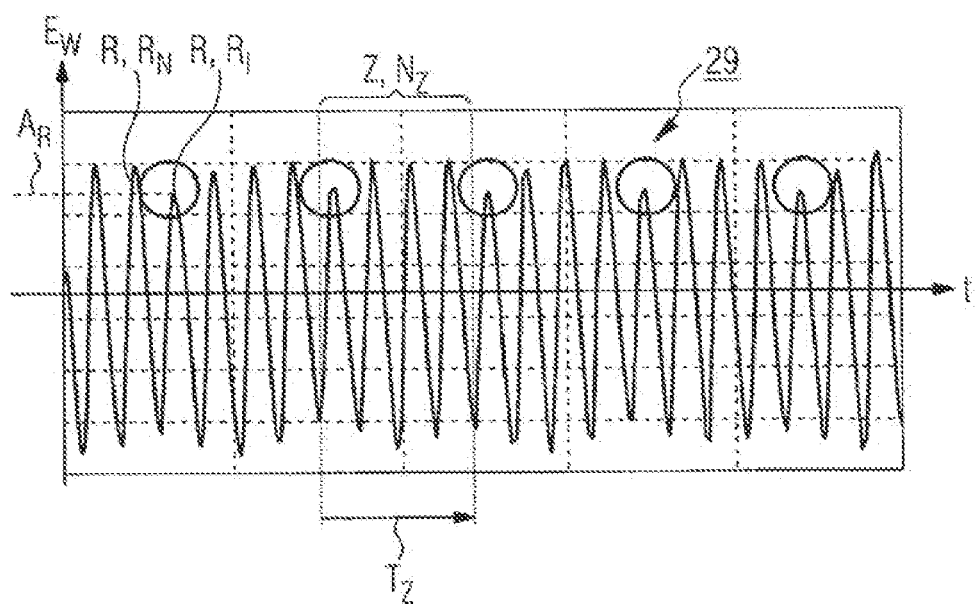
FIG. 3 is a schematic diagram of an AC component of the back electromotive force (BEMF) over time of a standard ripple pattern of the DC motor, which, as a result of a modification of the DC motor, includes for each half-cycle of the motor one index ripple, that is distinguished with regard to its amplitude and three additional current ripples that are not distinguished.

As a result of the armature winding that is fractional in such a manner, undisturbed, static operation of the motor 2 produces a standard ripple pattern 29, which is depicted in FIG. 3 using the behavior over time t of the AC component $E_W$ of the BEMF E. It is evident from FIG. 3 that the standard ripple pattern 29 has a total of four current ripples R per half-cycle Z, which is to say per 180° rotation of the rotor 23. The number of current ripples R per half-cycle Z is referred to below as the "cycle ripple count $N_Z$" (here: $N_Z$=4). Three current ripples R in each half-cycle Z here have an at least approximately equal ripple amplitude $A_R$, corresponding to the applicable maximum value of the AC component $E_W$. These current ripples R are referred to below as "not distinguished" current ripples $R_N$. In contrast, the fourth current ripple R remaining in each half-cycle Z—visually highlighted in FIG. 3 by circles—has a significantly reduced ripple amplitude $A_R$ in comparison to the remaining current ripples R. This (smaller) current ripple R is thus distinguished relative to the current ripples $R_N$ and is referred to below as index ripple $R_I$. The standard ripple pattern 29 thus corresponds to the coding –1:0:0:0 that was described above. As is evident from FIG. 3, the standard ripple pattern 29 repeats with each half-cycle Z in undisturbed, static operation of the motor 2.

The motor resistance $R_a$, the motor inductance $L_a$, and the typical half-cycle period $T_Z$ of the motor 2 are stored in the operating data memory 16 during normal operation of the actuating device 1, and are made available from this memory to the motor model 10 and the filter 11. Also stored in the operating data memory 16 are additional parameters (which is to say, concrete values for additional characteristic quantities) of the motor 2, in particular the number of slots 26 or teeth 27, the number of poles, the commutator segment pitch count, the rated voltage, the rated current, etc. During normal operation of the actuating device 1, the parameters of the motor 2 employed in the actuating device 1 that are required in each case—jointly referred to as the operating data $D_B$—are supplied from the operating data memory 16 to the actuator's components, in particular the motor model 10 and the filter 11, as well as to the analysis module 13 and the switch module 9 (in a manner that is not shown explicitly).

However, the operating data $D_B$ are only stored in the operating data memory 16 in a non-persistent (volatile) manner. Hence they are deleted when the control unit 5 is disconnected from the branch line 17, and thus from the supply voltage $U_V$. In like manner, the operating memory 16 also does not yet contain any operating data $D_B$ before the actuating device 1 is placed in service for the first time.

Instead, a set of standard parameters $D_S$ is transmitted from the parameter database 16 to the operating data memory 16—for example, by the motor detection module 14—upon initial startup of the actuating device 1, or when operation is resumed after a loss of the supply voltage $U_V$. The standard parameters $D_S$ are stored in the parameter database 15 in a persistent (nonvolatile) manner, so that they survive even a loss of the supply voltage $U_V$.

The standard parameters $D_S$ contain standard values for the motor resistance $R_a$, motor inductance $L_a$, and typical half-cycle period $T_Z$ in addition to the remaining parameters that are as suitable as possible for all the motor types that can be used in principle within the actuating device 1. In particular, the standard parameters $D_S$ contain average values or—especially for overload-critical characteristic quantities such as the rated voltage and rated current—generally tolerable minimum values for the characteristic quantities.

In general, therefore, the standard parameters $D_S$ deviate to a greater or lesser degree from the specific device constants of the motor 2 actually used within the actuating device 1.

For this reason, when the motor 1 is initially started up after the actuating device 1 is placed in service for the first time, or restarted following a loss of the supply voltage $U_V$, the motor detection module 14 carries out a process for motor detection which is described in detail below.

To this end, the motor detection module 14 accesses a parameter table T stored—likewise in a persistent manner—in the parameter database 15. This table contains a set of specific parameters, in particular concrete values for the motor resistance $R_a$, motor inductance $L_a$, and typical half-cycle period $T_Z$, for each of a plurality of different motor types.

For each of these motor types, the parameter database 15 contains information on an associated standard ripple pattern. The standard ripple patterns of all the motor types stored in the parameter database 15 are always different from one another in this context. In this way, each motor type is coded by, and is uniquely identifiable by, the standard ripple pattern associated with it.

Figure 4A:
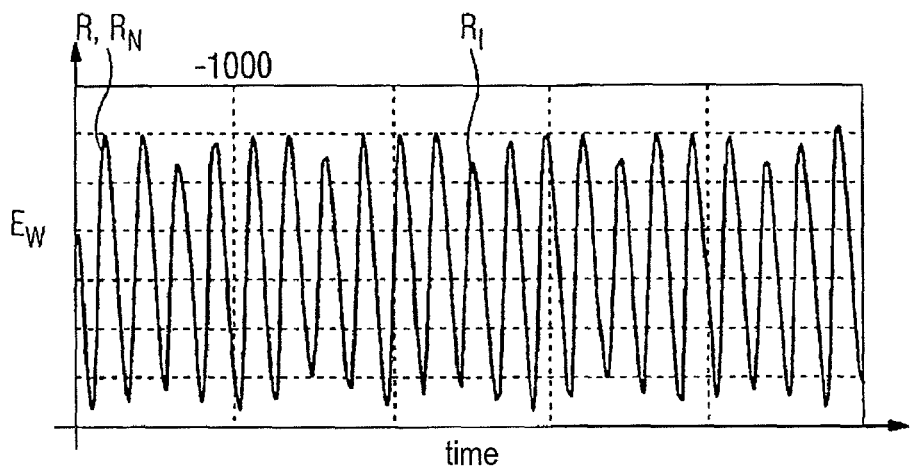
FIGS. 4a, 4b and 4c are three juxtaposed diagrams of the AC component of the back electromotive force (BEMF) over time of three different standard ripple patterns that are provided for coding of a specific associated motor type in each case.
Figure 4B:
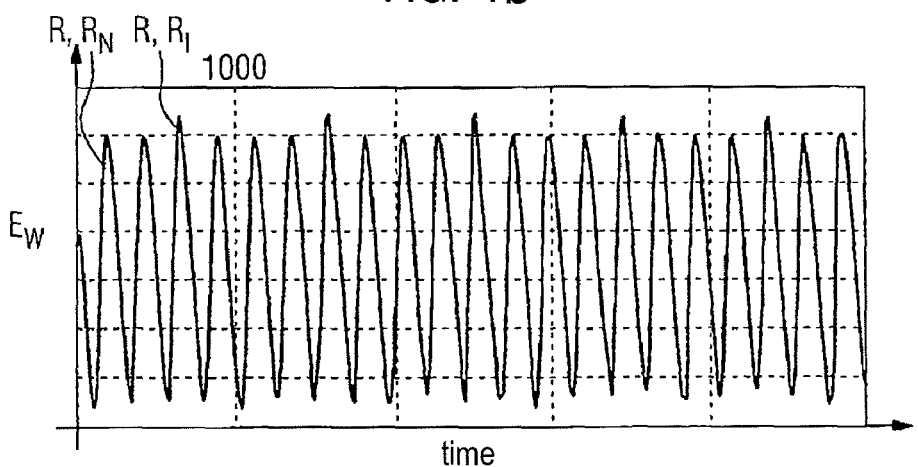
Figure 4C:
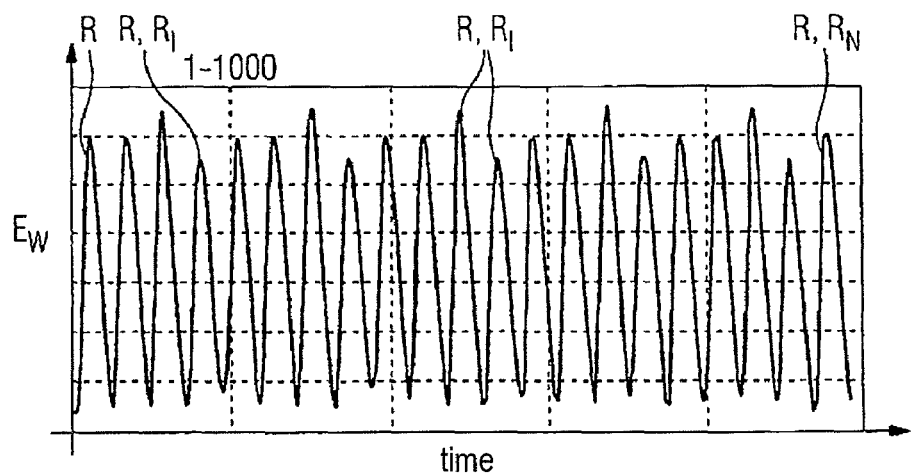

By way of example, FIGS. 4a, 4b and 4c show three standard ripple patterns, each associated with a specific motor type, that can have the following codings: –1,0,0,0 (three not-distinguished ripple currents $R_N$ followed by an index ripple $R_I$, smaller by comparison, of the type "–1"); 1,0,0,0 (three not-distinguished ripple currents $R_N$ followed by an index ripple $R_I$, larger by comparison, of the type "1"); and/or 1,–1,0,0 (two not-distinguished ripple currents $R_N$ followed by a first index ripple $R_I$ of the type "1", and a second index ripple $R_I$ of the type "–1").

As identifying information for each motor type, and hence for each associated ripple pattern, the parameter table T contains threshold conditions that the ripple currents $R_N$, $R_I$ of the applicable ripple pattern must fulfill. For example, to identify the standard ripple patterns shown in FIG. 4 the parameter table T contains the information set forth in Table 2:

TABLE 2

| Motor Type | Coding | Condition for Ripple Recognition | Parameters |
|---|---|---|---|
| A | 1:0:0:0 | "1": $A_R > S_2$ <br> "0": $S_1 < A_R < S_2$ | ... |
| B | –1:0:0:0 | "–1": $A_R < S_1$ <br> "0": $S_1 < A_R < S_2$ | ... |
| C | 1:–1:0:0 | "1": $A_R > S_2$ <br> "–1": $A_R < S_1$ <br> "0": $S_1 < A_R < S_2$ | ... |
| ... | ... | ... | ... |

The threshold values should be determined suitably here, for example, through empirical experiments, under the condition $S_1 < S_2$. For example, $S_1$ and $S_2$ are chosen such that their respective values are 90% and 110% of the average ripple amplitude $A_R$ of a not-distinguished ripple current $R_N$.

To perform motor detection, the motor detection module 14 uses the received ripple amplitudes $A_R$ to check the conditions for identifying the individual current ripples R of the associated ripple pattern for each stored motor type in a chain of conditions. When doing so, as soon as the motor detection module 14 has identified the ripple pattern of the motor 2 with one of the stored ripple patterns, the motor detection module 14 stops the detection routine and transmits the parameters that are stored in the parameter table T as belonging to this ripple pattern to the operating data memory 16 as new operating data $D_B$, whereupon the actuating device 1 changes over to normal operation.

In the example shown, the motor detection module 14 specifically checks in a first step whether the standard ripple pattern of the motor 2 corresponds to the standard ripple pattern 1:0:0:0 of the motor type "A" stored in the first location. Accordingly, it checks whether one of the received ripple amplitudes $A_R$ exceeds the threshold value $S_2$.

To avoid errors, the motor detection module 14 checks multiple half-cycles, in particular three half-cycles, thus the ripple amplitudes $A_R$ of a total of twelve detected current ripples R. If no index ripple of the type "1" is detected in this process, then the motor detection module 14 goes on to check the standard ripple pattern −1:0:0:0 corresponding to the motor type "B."

In order to detect the index ripple $R_I$ of the type "−1", it first checks whether one of the received ripple amplitudes $A_R$ falls below the threshold value $S_1$.

As soon as a received ripple amplitude $A_R$ fulfills this condition, in order to detect the current ripple $R_N$ of the type "0" the motor detection module 14 checks whether the three subsequently received ripple amplitudes $A_R$ fulfill the condition $S_1 < A_R < S_2$. If this is the case as well, then the motor detection module 14 stops the detection routine, assigns the motor 2 to the motor type "B," and transmits the associated parameters from the parameter table T to the operating data memory 16 as new operating data $D_B$.

If the motor detection module 14 is unable to assign the motor 2 to any of the stored motor types, then the actuating device 1 is operated with the standard parameters $D_S$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for automatic detection of a mechanically commutated DC motor, the method comprising:
    sensing an electrical motor quantity;
    detecting current ripples in a behavior the electrical motor quantity;
    analyzing an amplitude, a duration, and/or a position in time of the detected current ripples and comparing such with ripple patterns known in advance; and
    selecting a plurality parameters associated with a specific motor type from a parameter table that is known in advance when the amplitude, the duration, and/or the position in time of the detected current ripples match a ripple pattern that is associated with this motor type.

2. The method according to claim 1, wherein a back electromotive force or a quantity derived therefrom are used as the electrical motor quantity.

3. The method according to claim 2, wherein the back electromotive force is calculated using a measured motor current and a measured motor voltage via a motor model.

4. The method according to claim 2, wherein an AC component of the back electromotive force is used as the electrical motor quantity for determining the current ripples.

5. The method according to claim 1, wherein, whether or not the detected current ripples match a ripple pattern is checked via a comparison of the amplitude, the duration, and/or the position in time of the detected current ripples with threshold values stored for this ripple pattern in a parameter table.

6. A control unit configured to control a mechanically commutated DC motor of an actuating device for a motor vehicle, the control unit being configured to perform the method according to claim 1.

7. An actuating device for a motor vehicle comprising:
    a mechanically commutated DC motor; and
    a control unit according to claim 6.

8. Use of a mechanically commutated DC motor, which is coded through mechanical and/or electromechanical modification such that it has a characteristic current ripple pattern for identifying a particular motor type of which the DC motor is a member by sensing and analyzing the current ripples produced by the DC motor, the sensing and analyzing being performed according to the method of claim 1.

* * * * *